No. 890,290. PATENTED JUNE 9, 1908.
H. R. MOFF.
HAND TRUCK.
APPLICATION FILED FEB. 28, 1908.
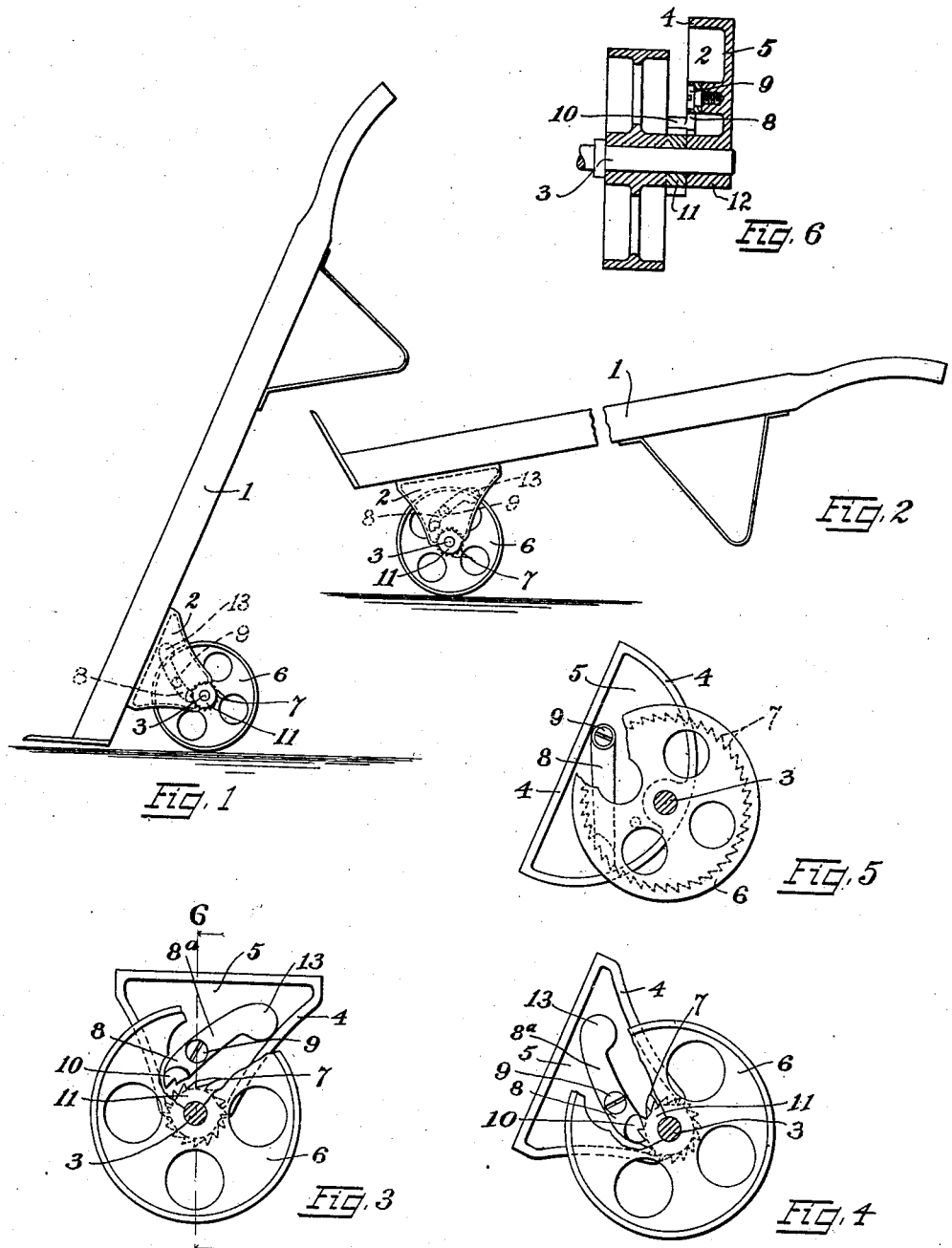

UNITED STATES PATENT OFFICE.

HERBERT R. MOFF, OF SALEM, OHIO.

HAND-TRUCK.

No. 890,290.   Specification of Letters Patent.   Patented June 9, 1908.

Application filed February 28, 1908. Serial No. 418,217.

*To all whom it may concern:*

Be it known that I, HERBERT R. MOFF, a citizen of the United States, residing at Salem, in the county of Columbiana and State of Ohio, have invented certain new and useful Improvements in Hand-Trucks, of which the following is a specification.

My invention relates to improvements in hand-trucks, the primary object of the invention being to provide means for preventing the rearward movement of the wheels, thus preventing the truck from slipping backward when applying a load to the truck.

It is well known to shippers and other users of warehouse hand-trucks, that it is a difficult matter to handle sacks of grain or heavy casks of merchandise with the ordinary truck, from the fact that in loading material the pressure backward is very great, and unless the truck is held in position by an extra hand it will frequently slip backward, dumping the load and causing the trouble to reload.

My improvement seeks to prevent any backward movement of the wheels when the truck is in position to receive the load and until the truck is adjusted out of such position toward a position for carrying the load.

With these ends in view, the invention consists in the novel construction, arrangement and combination of parts, hereinafter described, illustrated in the accompanying drawings, and particularly pointed out in the appended claims.

Referring to the drawings, forming a part of this specification, Figure 1, is a side elevation of a truck embodying the invention with the wheels locked and the truck in position to receive a load. Fig. 2, is a side elevation of the truck with the wheels unlocked and the truck in position after the load has been raised from the floor. Fig. 3, is a plan view of the inner side of one of the truck-wheels and axle-supporting-blocks, showing the position of the parts when the truck body is in a horizontal position. Fig. 4, is a similar view when the truck body is in a position to receive a load. Fig. 5, is a similar view showing a modified form of the invention. Fig. 6, is a sectional view taken through line 6,—6, of Fig. 3.

Similar numerals of reference designate like parts throughout all the figures of the drawings.

The body of the truck may be of the usual construction, comprising the ordinary side or handle-bars 1, supported at their lower ends upon axle-supporting-blocks or castings 2, carrying at their lower ends the transverse axle-shaft 3. The supporting-blocks or castings 2, are provided on their inner sides with peripheral strengthening flanges 4, forming and surrounding a cavity 5, in the body portion of the block or casting.

The truck-wheels 6, are mounted inside of the supporting-blocks 2, and on the axle-shaft 3, to revolve thereon independently of each other.

As a means of preventing the rearward movement of the truck-wheels 6, when the truck is in a position to receive a load, as indicated in Figs. 1, 4, and 5, ratchet-teeth 7, are suitably formed on the sides of the wheels adjacent to the blocks or castings 2, and, when in this position, are engaged by gravity-pawls 8, pivotally-mounted in the cavities 5, of the blocks 2, and within the planes of the peripheral flanges 4, by means of pivot tap-screws 9, the lower ends of said pawls 8, being provided with laterally-extending notched ends or heads 10, (see Figs. 3, 4, and 6) adapted to engage the ratchet-teeth.

The pawls 8, are adapted to have a limited movement within the cavities 5, by engagement with the flanges 4, when the truck is moved to a transporting position as indicated in Figs. 2, and 3, of the drawings.

The ratchet-teeth 7, are preferably formed on the hubs 11, of the truck-wheels 6, adjacent to the axle - shaft bearings, 12, (see Fig. 6) of the blocks or castings 2, and the pawls 8, are, preferably, provided with arms 8ª, terminating in counter-weights or heads 13; the relative position of the pivots and pawls with respect to the stop-flanges 4, and the ratchet-teeth 7, being such that the laterally-extending notched-heads 10, will engage with the ratchet-teeth when the truck is in position to receive its load, or being tilted to its transporting position, while when the truck is in the latter position and being moved, the pawls will be moved or tilted out of engagement with the ratchet-teeth, as illustrated in Figs. 2, and 3, of the drawings.

Having thus described my invention, what I claim and desire to secure by Letters Patent, is,—

1. A hand-truck, comprising a frame provided with axle-supporting-blocks having cavities surrounded by peripheral flanges, an axle-shaft carried in the lower ends of said blocks, truck-wheels mounted on said shaft and provided with ratchet-teeth, and gravity pawls pivotally-mounted and poised in the cavities of said blocks and provided with laterally-extending ends, said pawls engaging with said ratchet-teeth when the truck is moved to its elevated or load-receiving position and moving out of engagement therewith and into engagement with said peripheral flanges when the truck is moved to a substantially horizontal or transporting position.

2. In a hand-truck, the combination with a pair of axle-supporting-blocks provided with cavities in their inner sides surrounded by peripheral flanges and carrying an axle-shaft, and truck-wheels mounted on said shaft and provided with ratchet-teeth adjacent to said supporting-blocks; of gravity pawls pivotally-mounted in said cavities of said blocks and provided with laterally-extending notched-heads, said pawls normally engaging with said peripheral flanges and holding said notched-heads out of engagement with said ratchet-teeth.

3. A hand-truck, comprising side-bars, axle-supporting-blocks secured thereto and provided with cavities surrounded by flanges, an axle-shaft mounted in said blocks, truck-wheels mounted on said shaft and each provided with a ratchet-hub adjacent to said blocks, and gravity pawls pivotally-mounted within the planes of said flanges, said pawls terminating at one end in a laterally-extending end adapted to engage with said ratchet-hub when the truck is elevated and at the other in a counter-weight adapted to engage with said flanges and disengage said laterally extending end when the truck is in its transporting or horizontal position.

4. A hand-truck, comprising a frame carrying axle-supporting-blocks provided with peripheral flanges, an axle-shaft mounted in said blocks, truck-wheels mounted on said shaft and each provided with a ratchet-hub adjacent to said blocks, and gravity-pawls pivotally-secured to said blocks within the planes of said flanges, said pawls being provided with counter-weights adapted to engage with said peripheral flanges and hold said pawls out of engagement with said ratchet-hubs when the truck is moved to its transporting position.

In testimony whereof I have affixed my signature, in presence of two witnesses.

HERBERT R. MOFF.

Witnesses:
E. E. HANNA,
F. C. MOFF.